／United States Patent Office／3,556,999／Patented Jan. 19, 1971

3,556,999
STABILIZED FLUIDS
Nicholas V. Messina, Dresher, and Donald R. Senior, Levittown, Pa., assignors to Rohm and Haas Company, Philadelphia, Pa., a corporation of Delaware
No Drawing. Continuation-in-part of application Ser. No. 599,731, Dec. 7, 1966, which is a continuation-in-part of application Ser. No. 461,190, June 3, 1965. This application Jan. 23, 1968, Ser. No. 699,812
Int. Cl. C09k 3/00
U.S. Cl. 252—78      7 Claims

ABSTRACT OF THE DISCLOSURE

Hydraulic fluid compositions, particularly automatic transmission fluid compositions, containing a major amount of lubricating oil and a minor amount of each of (A) a phosphite or disubstituted phosphate, (B) a substituted phenol or an aromatic secondary amine and (C) an oil-soluble dispersant copolymer containing N-vinyl-2-pyrrolidone.

RELATED APPLICATIONS

This application is a continuation-in-part of U.S. patent application Ser. No. 599,731, filed Dec. 7, 1966, which is in turn a continuation-in-part of U.S. patent application Ser. No. 461,190, filed June 3, 1965.

DESCRIPTION OF THE INVENTION

This invention relates to stabilized fluids. It more particularly relates to hydraulic and automatic transmission fluids having superior stability toward oxidative deterioration. It further relates to hydraulic and automatic transmission fluids that, in addition to superior stability to oxidation, possess enhanced sludge dispersant properties. It further relates to compositions which are particularly useful for prolonged activity in automatic transmissions at elevated temperatures.

The compositions of the present invention include, in addition to the base fluid into which they are incorporated, at least three components, the presence of each of which is critically important for the purposes of the present invention. The first component may be defined by the formulas:

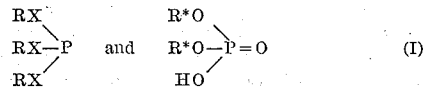

in which the R's and R*'s are alkyl groups of 1 to 8 carbon atoms, phenyl, or alkylphenyl in which the alkyl substitution totals up to 10 carbon atoms. Also, one of the R's may be hydrogen.

X is a chalcogen having an atomic weight of 16 to 32, i.e., oxygen or sulfur.

Typically, the R's and R*'s may represent methyl, ethyl, butyl, hexyl, octyl, phenyl, cresyl, dibutylphenyl or nonylphenyl. The alkyl groups may be present in any of their known spatial configurations, such as normal, iso or tertiary. They may be the same or different within any one compound, as desired. Typical embodiments of this component of the present invention include diethyl phosphite, dibutyl phosphite, dihexyl phosphite, ethyl octyl phosphite, butyl hexyl phosphite, triethyl phosphite, tributyl phosphite, diethyl phosphate, dibutyl phosphate, dioctyl phosphate, diethyl thiphosphite, dibutyl dithiophosphite, triethyl trithiophosphite, dioctyl thiophosphite, diphenyl phosphite, dicresyl phosphite, ethyl phenyl phosphite or diphenyl phosphate.

Within the definition of R and R* as alkyl, it is to be construed that they may contain one or more inert constituents, such as chlorine, bromine, hydroxy and the like.

The second component of the present composition may be represented by the following formulas:

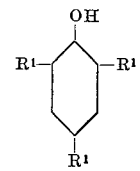

and

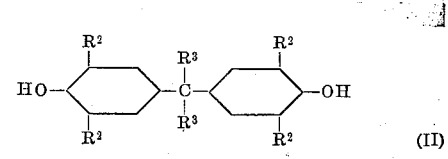

wherein the $R^1$'s represent hydrogen or alkyl groups containing up to 4 carbon atoms with the proviso that at least one of the $R^1$ groups in the ortho positions represents alkyl, preferably an alkyl with an iso- or tert- structure, the $R^2$'s represent hydrogen or alkyl groups containing up to 4 carbon atoms with the proviso that at least one of the $R^2$ groups in the ortho positions represents alkyl, preferably analkyl with an iso- or tert- structure, and the $R^3$'s represent hydrogen or alkyl of 1 to 4 carbon atoms, preferably hydrogen.

Typically, $R^1$ may represent hydrogen, methyl, ethyl, propyl or butyl, preferably isopropyl or t-butyl.

$R^2$ may typically represent hydrogen, methyl, ethyl, propyl or butyl, preferably isopropyl or t-butyl.

$R^3$ may typically represent hydrogen, methyl, ethyl or butyl.

Typical embodiments of the phenolic compounds just defined include cresol, 2-butylphenol, 2,6-di-t-butyl-4-methylphenol, 2,6 - dimethylphenol, 2 - ethyl-4-methylphenol, 2,6-dipropylphenol, 4,4'-methylenebis-(2-methylphenol), 2,4-dimethylphenol and the like.

While for practical purposes, only one embodiment of each of the compounds of Formulas I and II are used, mixtures of more than one of each are quite satisfactory for the present purposes.

Alternatively, the second component may be an aromatic amine represented by the following formula

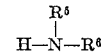

wherein $R^5$ and $R^6$ represent aryl and alkaryl; the aryl nucleus may be substituted with one, two or three alkyl radicals and each alkyl may have from 1 to 18 carbon atoms.

Typically, $R^5$ and $R^6$ represent phenyl, cresyl (o, m or p), trimethylphenyl, t-butylphenyl, di-t-butylphenyl, tributylphenyl, octylphenyl, dioctylphenyl, nonylphenyl, octadecylphenyl, α-naphthyl and β-naphthyl.

Representative embodiments of the aromatic amine component just defined include:

diphenylamine,
(2,4,6-trimethylphenyl)phenylamine,
p,p'-dicresyldiphenylamine,
p,p'-di-t-butyldiphenylamine,
p,p'-dioctyldiphenylamine,
(p-t-butylphenyl)phenylamine,
p,p'-dinonyldiphenylamine,
o,p'-dioctyldiphenylamine,
(p-t-butylphenyl)phenylamine, (p-octadecylphenyl)phenylamine,
phenyl-α-naphthylamine,
phenyl-β-naphthylamine,
p-octylphenyl-α-naphthylamine,
o,p-dioctylphenyl-α-naphthylamine and
p-t-butylphenyl-α-naphthylamine.

While for practical purposes, only one embodiment of each of the compounds of Formulas I and II is used, mixtures of more than one of each are quite satisfactory for the present purposes. Furthermore mixtures of a phenol according to Formula II and an aromatic amine according to Formula IIA may be used.

The third component of the present invention is an oil soluble copolymer of an N-vinylpyrrolidinone and at least one alkyl acrylate of methacrylate, in which the alkyl group or groups have sufficient size to insure solubility of the copolymer in the liquid petroleum base in which it is to be incorporated. The N-vinylpyrrolidinone should be present in the copolymer in an amount ranging beween about 0.1 and 20% by weight. Preferred content of the N-vinylpyrrolidinone in the copolymer is between 0.2 and 15% by weight, although in some situations it may be desirable to have a range of about 0.5 to 10% by weight.

The N-vinylpyrrolidinones which have been found useful include N-vinylpyrrolidinone itself, 3-methyl-1-vinylpyrrolidinone,
4-methyl-1-vinylpyrrolidinone,
5-methyl-1-vinylpyrrolidinone,
3-ethyl-1-vinylpyrrolidinone,
3-butyl-1-vinylpyrrolidinone,
3,3-dimethyl-1-vinylpyrrolidinone,
4,5-dimethyl-1-vinylpyrrolidinone,
5,5-dimethyl-1-vinylpyrrolidinone,
3,3,5-trimethyl-1-vinylpyrrolidinone,
4-ethyl-1-vinylpyrrolidinone,
5-methyl-5-ethyl-1-vinylpyrrolidinone,
3,4,5-trimethyl-3-ethyl-1-vinylpyrrolidinone and other lower alkyl substituted N-vinylpyrrolidinones.

The substituted N-vinylpyrrolidinones may be represented by the structure:

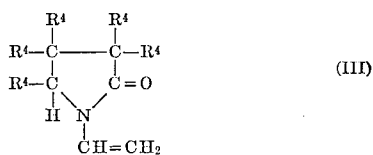 (III)

where the $R^4$'s are selected from the class consisting of hydrogen and alkyl groups of 1 to 4 carbon atoms. The preferred N-vinylpyrrolidinones are those having up to about 10 carbon atoms.

The balance of the copolymer is based primarily upon alkyl acrylates or methacrylates with alkyl groups at least up to octadecyl and of sufficient size on the average to ensure solubility in the liquid petroleum product in which it is to be incorporated.

Typical acrylates or methacrylates that can be employed are methyl, ethyl, butyl, octyl, decyl, dodecyl, tetradecyl, hexadecyl or octadecyl. It is, of course, preferred to use the higher molecular weight acrylates or methacrylates in order to insure solubility in the fluid in which it is to be used. However, it is frequently desirable, in order to produce certain effects, to incorporate some of the lower acrylate or methacrylate compounds. It is quite possible, and frequently desirable, to have mixtures of butyl acrylate or methacrylate along with dodecyl or octadecyl acrylate or methacrylate or both. It is also possible to have several acrylates or methacrylates present as mixtures, keeping in mind that the copolymer resulting therefrom should have sufficient oil solubility to be useful in the present circumstances. It is also possible to incorporate into the copolymer small amounts of other polymerizable monovinylidene compounds provided that any homopolymer formed, along with the copolymer, does not interfere with the purposes of the present invention. Typically, small amounts of butyl itaconate, dioctyl itaconate, didodecyl fumurate, vinyl laurate, vinyl stearate, among others, may be employed, which is to be construed to be within the gamut of this invention.

These polymers are readily prepared by techniques known to the art, preferably using free-radical polymerization techniques employing peroxide or azo type catalysts. Preferred dispersant copolymers are described in U.S. Pat. 3,147,222. The number average molecular weight, as determined by intrinsic viscosity methods, may vary from 2,000 to 1,000,000 or more, but generally varies from about 100,000 to about 600,000.

The three components of the present composition, described hereinbefore, are employed in defined amounts. The phosphite or phosphate component is employed in the range of about 0.01 to 5% by weight based on the fluid in which it is incorporated, preferably about 0.1 to 0.5% by weight. The oil-soluble aromatic amine is employed in the range of about 0.01 to 5% by weight with respect to the fluid in which it is to be used, preferably about 0.01 to 1% by weight. The defined copolymer is employed in the range of about 0.3 to 20% by weight with respect to the fluid in which it is to be used, preferably about 1 to 5% by weight.

It is important for the purposes of the present invention that one adhere strictly to the definitions of the three components given above; otherwise, valuable aspects of the present invention are not realized. One must adhere both to the specific structures defined and the percentages of each employed in the compositions of this invention. By strict adherence to the composition of this invention, one obtains a hydraulic fluid, particularly an automatic transmission fluid, that is unexpectedly superior in stability toward oxidation and possesses enhanced detergent-dispersant qualities.

While generally standard blending techniques are employed, one preferably preblends all of the above-described components before they are incorporated into the hydraulic fluid base.

Furthermore, if one employs the fluid base oil alone or with any of the three above components separately, oxidation resistance is inferior and unsatisfactory. Furthermore, any combination of two, but not all three of the three above-described components also gives inferior results. Base oils used herein for the hydraulic and automatic transmission fluids include a wide variety of light hydrocarbon oils, such as naphthenic base, paraffin base and mixtures of naphthenic and paraffin base mineral oils. The hydrocarbon oils may vary over a wide range of viscosity, such as 1 to 10 centistokes at 210° F.

Particularly preferred hydrocarbon base oils are blends of paraffin and napthenic petroleum oils. Representative of these are a Solvent Extracted 100 Neutral having a viscosity at 100° F. of 23.06 cs., a viscosity at 210° F. of 4.05 cs. and a viscosity index of 69 (hereinafter designated Base Oil A).

Another Solvent Extracted 100 Neutral may be identified as having a viscosity at 100° F. of 22.04 cs., a viscosity at 210° F. of 4.04 cs. and a viscosity index of 82 (hereinafter designated Base Oil B).

Among the methods employed to evaluate the compositions of the present invention is the Blotter Spot Test, described by Deen and Stendahl, Oxidation Stability, Shear Stability and Rubber Swell Properties of Automatic Transmission Fluids, Society of Automotive Engineering, October 1959. This test measures the time for sludge formation from an oil held at 325° F. The longer the time for sludge formation, the more stable the lubricant. When the test was conducted on an automatic transmission fluid base alone, the time to form a sludge the size of a standard blotter spot was 72 hours. Addition of one or two of the above-described three components of this invention gives somewhat higher values in some instances, but frequently no improvement was noted. When the composition of the present invention was strictly adhered to, the time to form sludge according to the above-described test standard consistently was well over 200 hours and in many cases was over 300 hours.

In the following formulations numbers 1, 2, 3, 7, 14, 15, 16, 17, 18, 20, 23, 24, 25, 29, 36 and 37, Base Oil A was employed and the oil-soluble N-vinyl-pyrrolidinone dispersant copolymer had an average number molecular weight of about 450,000. In formulation numbers 5, 21, 22, 27 and 38, Base Oil B was employed and the oil-soluble N-vinylpyrrolidinone dispersant copolymer had an average number molecular weight of about 250,000.

Typical formulations employing the described invention are as follows:

PERCENTAGES BY WEIGHT REMAINDER TO MAKE 100% OF HYDRAULIC BASE OIL (1)

0.3% 2-ethylhexyl phosphite
0.5% 2,6-di-t-butyl-p-cresol
1.7% copolymer consisting of
    7.9% N-vinyl-2-pyrrolidinone
    17.0% butyl methacrylate
    45.1% lauryl methacrylate
    30% stearyl methacrylate A formulation as above but including twice the amount of copolymer and 0.75% of the phospite gives similar results.

(2)

0.15% di-n-butyl phosphate
0.05% 2,6-di-t-butyl-cresol
1.7% copolymer consisting of
    7.9% N-vinyl-2-pyrrolidinone
    17.0% butyl methacrylate
    45.1% lauryl methacrylate
    30% stearyl methacrylate A formulation as above but including twice the amount of copolymer and 1% of the 2,6-di-t-butyl-p-cresol gives similar results.

(3)

0.33% triphenyl phosphite
0.5% 4,4'-methylenebis(2,6-di-t-butylphenol)
1.7% copolymer consisting of
    7.9% N-vinyl-2-pyrrolidinone
    17.0% butyl methacrylate
    45.1% lauryl methacrylate
    30% stearyl methacrylate A formulation as above but including 0.75% of 4,4'-methylenebis(2,6-di-t-butylphenol) and 8% of the copolymer gives similar results.

(4)

0.26% dibutyl phosphite
0.5% 2,6-di-t-butyl-p-cresol
1.8% copolymer consisting of
    2% N-vinyl-2-pyrrolidinone
    33% butyl methacrylate
    30% isodecyl methacrylate
    35% cetyl stearyl methacrylate
(made from a commercially available alcohol containing 2% tetradecanol, 30% hexadecanol, 68% octadecanol).

(5)

0.2% dibutyl phosphite
0.5% 2,6-di-t-butyl-p-cresol
1.8% copolymer consisting of
    9.5% N-vinyl-2-pyrrolidinone
    25% butyl methacrylate
    37.5% isodecyl methacrylate
    28% cetyl stearyl methacrylate A formulation as above except using 3-butyl-1-vinyl-pyrrolidinone in the copolymer gives similar results.

(6)

0.3% triphenyl phosphite
0.6% 2,6-dibutyl-4-methylphenol
2.4% copolymer consisting of
    10% N-vinyl-2-pyrrolidinone
    8% butyl methacrylate
    46% isodecyl methacrylate
    36% cetyl stearyl methacrylate (7)

0.3% dicyclohexyl phosphite
0.5% 2,6-di-t-butyl-p-cresol
2.2% copolymer consisting of
    7.9% N-vinyl-2-pyrrolidinone
    17.0% butyl methacrylate
    45.1% lauryl methacrylate
    30% stearyl methacrylate (8)

0.25% dibutyl phosphate
0.5% 2,6-di-t-butyl-p-cresol
1.7% copolymer consisting of
    9.5% N-vinyl-2-pyrrolidinone
    7.5% butyl methacrylate
    57% isodecyl methacrylate
    26% cetyl stearyl methacrylate A formulation as above except using 4,5-dimethyl-1-vinyl-pyrrolidinone in the copolymer gives similar results.

(9)

0.2% diethyl phosphate
0.5% 2,6-di-t-butyl-p-cresol
1.6% copolymer consisting of
    12% N-vinyl-2-pyrrolidinone
    10% butyl methacrylate
    30% cetyl stearyl methacrylate
    48% lauryl myristyl methacrylate
(made from a commercially available alcohol containing 4% decanol, 66.4% dodecanol, 27.2% tetradecanol, 2.4% hexadecanol).

(10)

0.2% dibutyl phosphite
0.5% 2,6-di-t-butyl-p-cresol
1.7% copolymer consisting of
    16% N-vinyl-2-pyrrolidinone
    10% butyl methacrylate
    46% lauryl myristyl methacrylate
    28% cetyl stearyl methacrylate (11)

0.2% dibutyl phosphite
0.5% 2,6-di-t-butyl-p-cresol
1.9% copolymer consisting of
    2% N-vinyl-2-pyrrolidinone
    28% ethyl acrylate
    40% lauryl myristyl methacrylate
    30% cetyl stearyl methacrylate (12)

0.2% dibutyl phosphite
0.5% 2,6-di-t-butyl-p-cresol
1.8% copolymer consisting of
    2% N-vinyl-2-pyrrolidinone
    20% ethyl acrylate
    36% lauryl myristyl methacrylate
    42% cetyl stearyl methacrylate (13)

0.2% dibutyl phosphite
0.5% 2,6-di-t-butyl-p-cresol 2.1% copolymer consisting of
   1.5% N-vinyl-2-pyrrolidinone
   28% ethyl acrylate
   40.5% lauryl myristyl methacrylate
   30% cetyl stearyl methacrylate (14)

0.2% dibutyl phosphite
0.5% 2,6-di-t-butyl-p-cresol
1.7% copolymer consisting of
   7.9% N-vinyl-2-pyrrolidinone
   17.0% butyl methacrylate
   45.1% lauryl methacrylate
   30% stearyl methacrylate (15)

0.3% dibutyl phosphite
0.5% 2,6-di-t-butyl-p-cresol
1.5% copolymer consisting of
   7.9% N-vinyl-2-pyrrolidinone
   17.0% butyl methacrylate
   45.1% lauryl methacrylate
   30% stearyl methacrylate (16)

0.4% dibutyl phosphite
0.75% 2,6-di-t-butyl-p-cresol
1.7% copolymer consisting of
   7.9% N-vinyl-2-pyrrolidinone
   17.0% butyl methacrylate
   45.1% lauryl methacrylate
   30% stearyl methacrylate (17)

0.4% dibutyl phosphate
0.25% 2,6-di-t-butyl-p-cresol
2.0% copolymer consisting of
   7.9% N-vinyl-2-pyrrolidinone
   17.0% butyl methacrylate
   45.1% lauryl methacrylate
   30% stearyl methacrylate A formulation as above except using diethyl phosphate gives similar results.

(18)

0.2% dibutyl phosphite
0.5% 2,6-di-t-butyl-p-cresol
0.5% p,p'-dioctyldiphenylamine
1.8% copolymer consisting of
   7.9% N-vinyl-2-pyrrolidinone
   17.0% butyl methacrylate
   45.1% lauryl methacrylate
   30% stearyl methacrylate (19)

0.3% triphenyl phosphite
0.4% p,p'-dioctyldiphenylamine
0.6% 2,6-dipropylphenol
1.7% copolymer consisting of
   10% N-vinyl-2-pyrrolidinone
   8% butyl methacrylate
   46% isodecyl methacrylate
   36% cetyl stearyl methacrylate (20)

0.5% dibutyl phosphite
0.5% 2,6-di-t-butyl-p-cresol
0.2% zinc diamyldithiocarbamate
1.7% copolymer consisting of
   7.9% N-vinyl-2-pyrrolidinone
   17.0% butyl methacrylate
   45.1% lauryl methacrylate
   30% stearyl methacrylate (21)

0.3% triphenyl phosphite
0.1% dibutyl phosphite
0.2% zinc diamyldithiocarbamate
1.6% copolymer consisting of
   9.5% N-vinyl-2-pyrrolidinone
   25% butyl methacrylate
   37.5% isodecyl methacrylate
   28% cetyl stearyl methacrylate (22)

0.3% triphenyl phosphite
0.1% dibutyl phosphite
0.2% zinc diamyldithiocarbamate
0.5% 2,6-di-t-butyl-p-cresol
1.6% copolymer consisting of
   9.5% N-vinyl-2-pyrrolidinone
   25% butyl methacrylate
   37.5% isodecyl methacrylate
   28% cetyl stearyl methacrylate A formulation as above except employing dioctylthiophosphite in place of the triphenyl phosphite gives similar results.

(23)

0.2% dibutyl phosphite
0.25% p,p'-dioctyldiphenylamine
5.0% copolymer consisting of
   7.9% N-vinyl-2-pyrrolidinone
   17.0% butyl methacrylate
   45.1% lauryl methacrylate
   30% stearyl methacrylate A formulation as above but using one half the amount of copolymer and 0.75% of the phosphite gives similar results.

(24)

0.2% dibutyl phosphite
0.5% p,p'-dioctyldiphenylamine
1.7% copolymer consisting of
   7.9% N-vinyl-2-pyrrolidinone
   17.0% butyl methacrylate
   45.1% lauryl methacrylate
   30% stearyl methacrylate A formulation as above but including twice the amount of copolymer and 1% of the p,p'-dioctyldiphenylamine gives similar results.

(25)

0.2% dibutyl phosphite
0.25% p,p'-dioctyldiphenylamine
6.0% copolymer consisting of
   7.9% N-vinyl-2-pyrrolidinone
   17.0% butyl methacrylate
   45.1% lauryl methacrylate
   30% stearyl methacrylate A formulation as above but including 0.75% of p,p'-dioctyldiphenylamine and 3% of the copolymer gives similar results.

(26)

0.26% dibutyl phosphite
0.5% p,p'-dioctyldiphenylamine
5.0% copolymer consisting of
   2% N-vinyl-2-pyrrolidinone
   33% butyl methacrylate
   30% isodecyl methacrylate
   35% cetyl stearyl methacrylate (made from a commercially available alcohol containing 2% tetradecanol, 30% hexadecanol, 68% octadecanol).

(27)

0.2% dibutyl phosphite
0.5% p,p'-dioctyldiphenylamine 1.8% copolymer consisting of
    9.5% N-vinyl-2-pyrrolidinone
    25% butyl metharcylate
    37.5% isodecyl methacrylate
    28% cetyl stearyl methacrylate A formulation as above using 3-butyl-1-vinyl-pyrrolidinone in the copolymer gives similar results.

(28)

0.2% dibutyl phosphite
0.6% phenyl-α-naphthylamine
2.4% copolymer consisting of
    10% N-vinyl-2-pyrrolidinone
    8% butyl methacrylate
    46% isodecyl methacrylate
    36% cetyl stearyl methacrylate (29)

0.3% dicyclohexyl phosphite
0.5% phenyl-α-naphthylamine
5.0 % copolymer consisting of
    7.9% N-vinyl-2-pyrrolidinone
    17.0% butyl methacrylate
    45.1% lauryl methacrylate
    30% stearyl methacrylate (30)

0.25% dibutyl phosphate
0.5% p,p'-dioctyldiphenylamine
1.7% copolymer consisting of
    9.5% N-vinyl-2-pyrrolidinone
    7.5% butyl methacrylate
    57% isodecyl methacrylate
    26% cetyl stearyl methacrylate A formulation as above except using 4,5-dimethyl-1-vinyl-pyrrolidinone in the copolymer gives similar results.

(31)

0.2% dibutyl phosphite
0.5% p,p'-dioctyldiphenylamine
0.26% zinc diphenyldithiophosphate
5.0% copolymer consisting of
    12% N-vinyl-2-pyrrolidinone
    10% butyl methacrylate
    30% cetyl stearyl methacrylate
    48% lauryl myristyl methacrylate (made from a commercially available alcohol containing 4% decanol, 66.4% dodecanol, 27.2% tetradecanol, 2.4% hexadecanol).

A formulation as above except using one half the amount of copolymer gives similar results.

(32)

0.2% dibutyl phosphite
0.75% p,p'-dioctyldiphenylamine
0.25% phosphosulfurized terpene
5.0% copolymer consisting of
    16% N-vinyl-2-pyrrolidinone
    10% butyl methacrylate
    46% lauryl myristyl methacrylate
    28% cetyl stearyl methacrylate (33)

0.2% dibutyl phosphite
0.5% p,p'-dioctyldiphenylamine
0.25% oleic acid dimer
5.0% copolymer consisting of
    2% N-vinyl-2-pyrrolidinone
    28% ethyl acrylate
    40% lauryl myristyl methacrylate
    30% cetyl stearyl methacrylate (34)

0.2% dibutyl phosphite
0.5% p,p'-dioctyldiphenylamine
0.2% zinc diamyl dithiocarbamate
6.0% copolymer consisting of
    2% N-vinyl-2-pyrrolidinone
    20% ethyl acrylate
    36% lauryl myristyl methacrylate
    42% cetyl stearyl methacrylate (35)

0.2% dibutyl phosphate
0.5% phenyl-α-naphthylamine
2.1% copolymer consisting of
    1.5% N-vinyl-2-pyrrolidinone
    28% ethyl acrylate
    40.5% lauryl myristyl methacrylate
    30% cetyl stearyl methacrylate (36)

0.2% triphenyl phosphite
0.5% p,p'-dioctyldiphenylamine
1.7% copolymer consisting of
    7.9% N-vinyl-2-pyrrolidinone
    17.0% butyl methacrylate
    45.1% lauryl methacrylate
    30% stearyl methacrylate (37)

0.3% dibutyl phosphite
0.5% p,p'-dinonyldiphenylamine
5.0% copolymer consisting of
    7.9% N-vinyl-2-pyrrolidinone
    17.0% butyl methacrylate
    45.1% lauryl methacrylate
    30% stearyl methacrylate (38)

0.3% triphenyl phosphite
0.1% dibutyl phosphite
0.5% p,p'-dioctyldiphenylamine
5.0% copolymer consisting of
    9.5% N-vinyl-2-pyrrolidinone
    25% butyl methacrylate
    37.5% isodecyl methacrylate
    28% cetyl stearyl methacrylate A formulation as above except employing diotylthiophosphite in place of the triphenyl phosphite gives similar results.

(39)

0.2% dibutyl phosphite
0.5% p,p'-dioctyldiphenylamine
1.9% copolymer consisting of
    0.5% N-vinyl-2-pyrrolidinone
    28% ethyl acrylate
    41.5% lauryl myristyl methacrylate
    30% cetyl stearyl methacrylate The composition of the present invention is mixed by normal blending operations according to standard techniques. Solubilizing of the components may be hastened by heating said components to a temperature of 140° F. for about one-half hour.

The above formulations all show satisfactory antiwear values in the standardized Shell Four Ball Test. Although dialkyl and diaryl acid phosphites as well as the mono and dialkyl or aryl acid phosphates function as satisfactory antiwear agents in the hydraulic fluid compositions of this invention, both trialkyl and triaryl phosphates have proven to be ineffective antiwear agents in the hydraulic fluid compositions described in this invention. It is to be noted that in some instances, because of possible extreme wear conditions, one may desire small percentages of phosphorus sulfur compounds, such as phosphosulfurized terpene, sulfurized sperm oil, $P_4S_3$, phosphosulfurized polyolefins, $P_4S_7$ and the like. These are readily compatible with the three compounds of this invention. Also, there may be employed antirust agents, heavy-duty detergents and other known additive types in order to bring about special effects. For instance, there may be used zinc, barium or nickel dialkyldithiophosphate and the corresponding diaryldithiophosphates, alkylaryl sulfonates, calcium, barium or strontium petroleum sulfonates, alkaline earth phenate sulfides, such as those of calcium and barium, silicones or alkylaryl phosphate, dimers and trimers of unsaturated fatty acids, metal dialkyl dithiocarbamates (zinc diamyldithiocarbamates), phenothiazines, boron halides, boron esters, among others.

What is claimed is:

1. A composition adapted to be used as a hydraulic fluid consisting essentially of a hydrocarbon oil and a plurality of additives including as essential ingredients, (A) from 0.01 to 5% by weight of dibutylphosphite, (B) from 0.01 to 5% by weight of 2,6-di-t-butyl-para-cresol, and (C) from 0.3 to 20% by weight of an oil soluble methacrylate copolymer of an N-vinyl-2-pyrrolidinone having the formula:

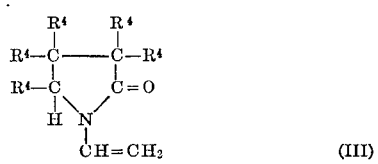 (III)

wherein said N-vinyl-2-pyrrolidinone is present in the range of about 0.1 to 20% by weight in said copolymer and wherein $R^4$ is selected from the class consisting of hydrogen and alkyl of 1 to 4 carbon atoms, said weight percentages being based upon the total weight of the fluid composition, said copolymer having a number average molecular weight of at least 2,000.

2. A composition according to claim 1 wherein component (A) is employed in the range of about 0.1 to 0.5% by weight, component (B) is employed in the range of about 0.01 to 1% by weight and component (C) is employed in the range of about 1 to 5%.

3. A composition according to claim 1, wherein $R^4$ is hydrogen.

4. A composition according to claim 1, wherein $R^4$ is alkyl of 1 to 4 carbon atoms.

5. A composition according to claim 1 wherein component (C) is a copolymer comprising:
7.9% N-vinyl-2-pyrrolidinone
17.0% butyl methacrylate
45.1% lauryl methacrylate
30% stearyl methacrylate.

6. A composition according to claim 1 wherein component (C) is a copolymer comprising:
12% N-vinyl-2-pyrrolidinone
10% butyl methacrylate
30% cetyl stearyl methacrylate
48% lauryl myristyl methacrylate.

7. A composition according to claim 1 wherein component (C) is a copolymer comprising:
2% N-vinyl-2-pyrrolidinone
33% butyl methacrylate
30% isodecyl methacrylate
35% cetyl stearyl methacrylate.

References Cited

UNITED STATES PATENTS

| | | | |
|---|---|---|---|
| 3,019,191 | 1/1962 | Furby et al. | 252—78 |
| 3,115,465 | 12/1963 | Orloff et al. | 252—49.9 |
| 3,116,248 | 12/1963 | Frew | 252—32.5 |
| 3,153,632 | 10/1964 | Sprague et al. | 252—75 |

OTHER REFERENCES

Hatton: Introduction to Hydraulic Fluids, Reinhold Publishing Corp., New York, 1962, p. 192.

LEON D. ROSDOL, Primary Examiner

D. SILVERSTEIN, Assistant Examiner

U.S. Cl. X.R.
252—400, 403, 404